United States Patent [19]

Fleischer

[11] 4,075,720
[45] Feb. 28, 1978

[54] SUPPORT FRAMES ADAPTED FOR USE WITH CAR SEATS AND BEDS

[76] Inventor: Henry Fleischer, 18 Notch Park Road, Little Falls, N.J. 07424

[21] Appl. No.: 758,846

[22] Filed: Jan. 12, 1977

[51] Int. Cl.² .............................................. A47D 7/04
[52] U.S. Cl. ......................................... 5/94; 297/243; 248/158
[58] Field of Search ................. 5/94, 95, 92; 248/150, 248/121, 316 A; 297/250, 243, 172; 108/121

[56] References Cited

U.S. PATENT DOCUMENTS

| 871,624 | 11/1907 | Pitcher | 297/243 |
|---|---|---|---|
| 918,789 | 4/1909 | Spear | 5/95 |
| 982,093 | 1/1911 | Russ | 108/121 |
| 1,173,480 | 2/1916 | Bulik | 297/172 |
| 1,362,987 | 12/1920 | Dunn | 5/94 |
| 1,366,405 | 1/1921 | MacGowan | 5/94 |
| 1,596,689 | 8/1926 | Silver | 5/94 |
| 2,653,781 | 9/1953 | Niemeier | 248/150 |
| 3,669,392 | 6/1972 | Saunders | 248/316 A |
| 3,963,272 | 6/1976 | Jones | 297/172 |

FOREIGN PATENT DOCUMENTS 971,253  9/1964  United Kingdom ................. 297/243

Primary Examiner—Francis K. Zugel

[57] ABSTRACT

A universal type locking or support frame is provided adapted for use in automobiles or other type vehicles to support and anchor a child's car bed and/or car seat, which frame includes base means for securing the frame within a vehicle, the base means being preferably deployed under a seat thereof, longitudinal support means, preferably comprising a pair of spaced apart members, pivotally connected to the base means and extending upwards therefrom, and adapted to be preferably deployed in abutting relation to the lower front of the bench portion of the automobile seat under which the base is secured, and extending above such bench portion. The bench portion and the portion of the pair of spaced longitudinal support means extending above same in conjunction with the bench portion of the automobile seat defines an area for supporting and confining a car bed or car seat in front to rear or side to side disposition. The locking frame of the invention may optionally include one or more laterally disposed support members pivotaly connected to the longitudinal support means, and adapted to extend from the longitudinal support means over the bench portion in contact therewith or above same. The optional lateral support members may thus serve as a base for a car bed or in conjunction with the longitudinal support means will define an area of confinement for the car bed or car seat.

Other similar embodiments of support-locking frames adapted to be deployed in automobiles for supporting and securing car beds and seats are disclosed as well.

13 Claims, 20 Drawing Figures

FIG.13
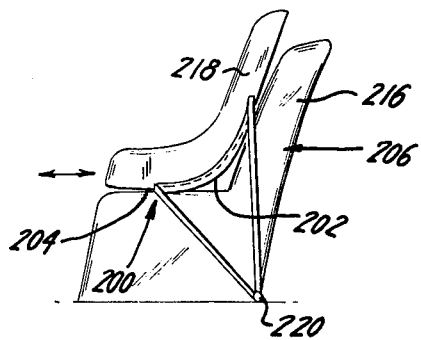
FIG.14
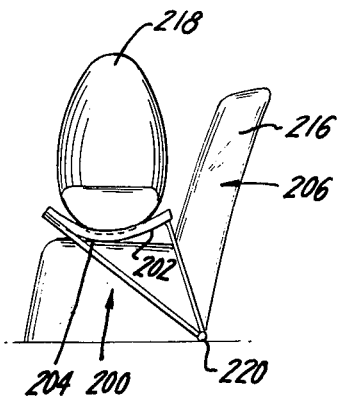
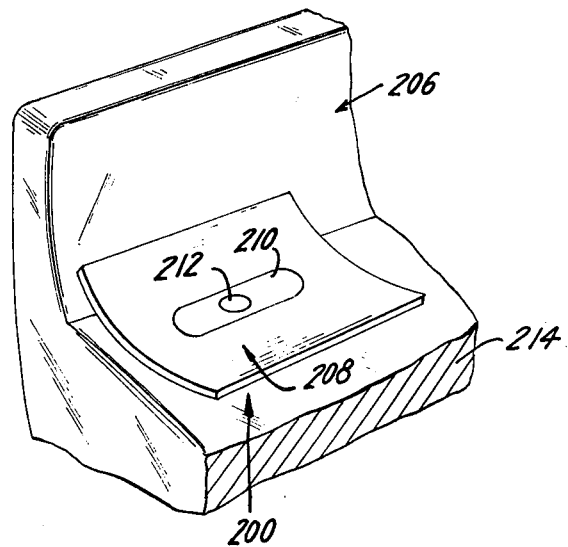
FIG.15

4,075,720

SUPPORT FRAMES ADAPTED FOR USE WITH CAR SEATS AND BEDS

FIELD OF THE INVENTION

The present invention relates to frames which are adapted to be employed in automobiles to support and secure and thereby serve as sturdy foundations for car beds and/or car seats.

BACKGROUND OF THE INVENTION

A large variety of car seats and car beds are available in the marketplace. They are usually complete units unto themselves in that they include baby holding means as well as means for securing the seat or bed to the seat of the automobile. One type of car set or bed includes large hook-like members which hook around the back rest portion of the front seat. Another type car seat or bed includes hook members extending from the rear of the seat which slip into the space between the bottom of the back rest and the bench portion of a front or rear seat and hook under and around the back rest of such seat. These types of car seats or beds have enjoyed some commercial success. However, notwithstanding such success, the fact remains as almost everyone has experienced, when the automobile is brought to a sudden stop or subjected to jerky abrupt motion, the car seat or bed (with the hook-like support members) tend to dislodge causing the car seat or bed to be jarred or even be struck against the automobile seat, dashboard or door, and possibly causing injury to a child in the seat or bed. In addition, the hook-like members of the seat or bed tend to wear out and tear automobile seats and covers.

Other type car seats or beds available employ a system of straps to secure the car seat or bed to the seat of the automobile. Such a system, albeit is more secure than the hook members described above, but is cumbersome and unattractive and just adds to the confusion created by the mass of seat belts already existing in most automobiles.

The present invention avoids the above disadvantages and provides several different embodiments of support frames and systems for securing almost any type of car beds and/or car seats to the bench portion of a seat of an automobile. The systems of the invention do not require the use of hooks or an array of untidy belts, although some straps may be employed as will be seen hereinafter.

BRIEF DESCRIPTION OF THE INVENTION

In accordance with the present invention, there is provided a universal type locking or support frame adapted for use in automobiles (as well as in the home) as a sturdy foundation and anchor for car beds and/or car seats. The support frame of the invention includes base means for securing the frame within a vehicle, for example, in the form of one or more arms which extend under a rear (or front) seat of an automobile, longitudinally or normally vertically disposed support members pivotally connected to the base means extending upwardly therefrom and adapted to abut against the bench of the seat under which the base is secured and extend above the bench. The latter support means may take the form of a pair of spaced apart leg members which extend above the bench and between which a car bed or car seat may be positioned on the bench against the back rest in front to rear attitude. The leg members together with the back rest portion of the automobile seat may also define a safe confined area for positioning a car bed or car seat sideways or front to rear on the bench portion of the automobile seat. The frame of the invention may optionally, but preferably, include one or more laterally disposed support arms pivotally connected to the longitudinally disposed support members which support arms may be deployed on the bench portion of the automobile seat and serve as a flat base and/or a confined seat area for the car seat or car bed. The support arms may also be moved along the longitudinal support means above the bench and locked into such position to serve as further means of confinement for the car bed or seat. The above-described frame may easily be folded and stored in the automobile without disturbing driver or passengers.

In an alternate embodiment of the present invention, a frame is provided which includes a movable base portion which is adapted to sit on the bench portion of an automobile seat and support a car bed or car seat, and means for securing the movable base to the back rest portion of the automobile seat or to securing means disposed behind the front seats, behind or above the back seats, or any other conventional location. The frame is adapted to remain in the automobile even after the car seat, car bed or other child carrier has been removed and pivot out of the way of the driver or passenger. The base portion may also include locking means, such as track means, to lock the car bed or seat thereto and pivot means to position the car bed or seat front to back or sideways.

BRIEF DESCRIPTION OF THE DRAWINGS

FIG. 13 is a side view of yet another embodiment of the frame of FIG. 8 deployed with a car seat;

FIG. 14 is a side view of the frame of FIG. 13 deployed with a car bed; and

FIG. 15 is a schematic perspective view of the frame shown in FIGS. 13 and 14.

DETAILED DESCRIPTION OF FIGURES AND PREFERRED EMBODIMENTS OF THE INVENTION

Referring now to the accompanying Figures wherein like parts are represented by like numerals in the several views, there is shown in FIGS. 1 to 7 a universal-type locking frame indicated generally by the numeral 10, which may be installed or deployed in an automobile and serve as a secure device to which a car seat, car bed or other type child holding device or carrier may be secured or anchored. The frame 10 may remain in the automobile (folded out of the way when not in use) until the need for a car bed, car seat, etc. is exhausted.

Figure 1:
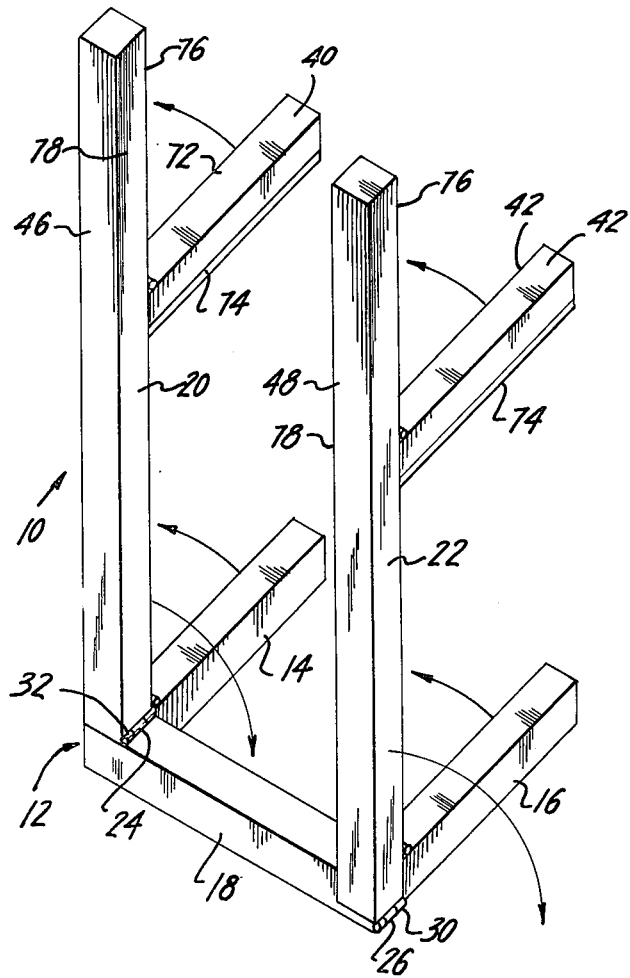
FIG. 1 is a schematic perspective view of one type of support frame including laterally disposed support arm members in accordance with the present invention.
Figure 2:
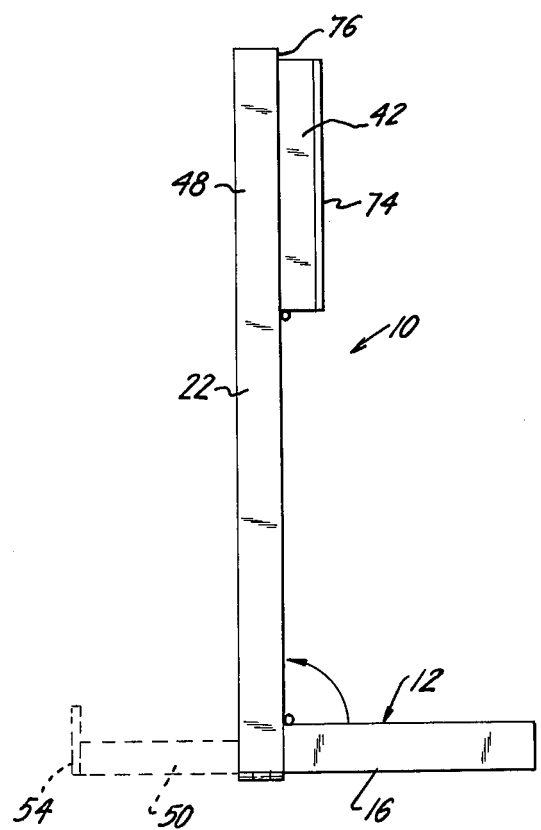
FIG. 2 is a side view of the frame of FIG. 1 wherein the laterally disposed arm members are pivoted out of the way to a storage position.
Figure 3:
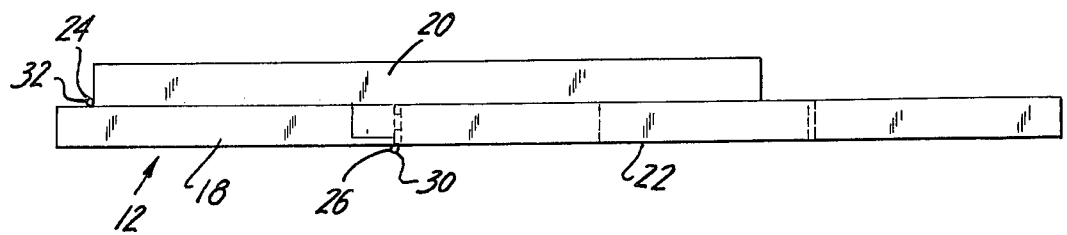
FIG. 3 is a front view of the frame collapsed.
Figure 4:
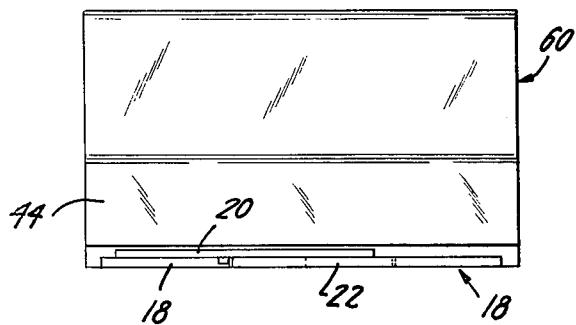
FIG. 4 is a front view of the frame of FIG. 1 folded for storage in an automobile.
Figure 6:
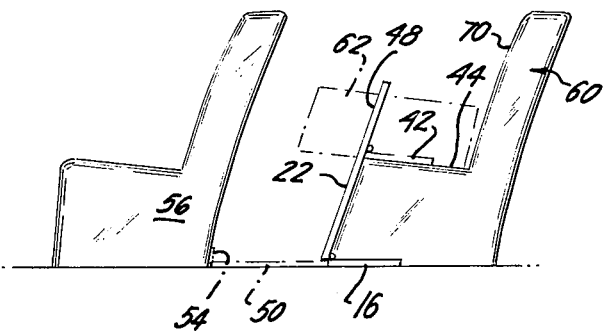
FIG. 6 is a side view of a frame as shown in FIG. 1 deployed with the back seat of an automobile.
Figure 5:
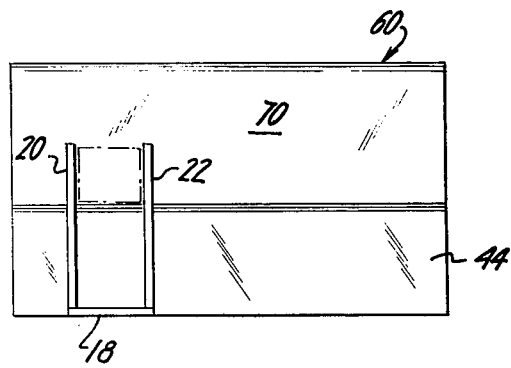
FIG. 5 is a front view of the frame of FIG. 1 in its working position deployed with the back seat of an automobile.

The frame 10 includes a base portion 12 which is adapted to fit under the bench portion 44 of a seat 60 of an automobile (as best shown in FIG. 6) and as such may comprise a pair of arms 14, 16 which are connected (preferably pivotally connected) to cross member 18. Longitudinally disposed members 20, 22 are pivotally attached to cross member 18. In a preferred embodiment as shown in FIGS. 1 to 3, the longitudinal member 20 is pivotally connected or hinged at a top portion 24 of the cross member 18 while the longitudinal member 22 is pivotally attached or hinged at bottom (recessed) portion 26 of cross member 18; upon collapsing the frame 10 for storage, the longitudinal member will first be rotated counter-clockwise about hinge 30 to the horizontal position shown in FIG. 3, and the longitudinal member 20 may then be rotated counter-clockwise about hinge 32 to the horizontal position shown in FIG. 3; thus during storage, these members will be at floor level safely out of the way of a passenger. However, it will be appreciated that the members 20, 22 may be connected to cross brace 18 in any convenient manner so that the members 20, 22 may be folded downwardly to the left and/or to the right of the cross brace 18. Furthermore, one of the legs 20, 22 may fold downwardly in front or behind or on top of the other of legs 22, 20.

Laterally disposed arms 40, 42 are pivotally connected to the longitudinal members 20, 22, respectively, and function in conjunction with arms 14, 16 to secure the frame 10 in place against the lower bench portion 44 as best shown in FIG. 6. The arms 40, 42 may also be moved up and down the longitudinal members 20, 22 (employing conventional track, rails or grooves to accomplish same) so that the position of arms 40, 42 may be fixed at any desired position above the bench.

As seen in FIG. 2, the arms 40, 42 may be pivoted upwardly against upper portions 46, 48 of longitudinal members 20, 22, respectively. Thus upon folding of frame 10 for storage (as shown in FIG. 3), the arms 40, 42 will be neatly tucked out of the way.

One or more of the arms 14, 16, longitudinal members 20, 22 and arm members 40, 42 may be made to be telescoping employing conventional means so that said members may be fixed at a desired position.

The locking frame may further include conventional locking means for holding the various members in place.

Figure 7:
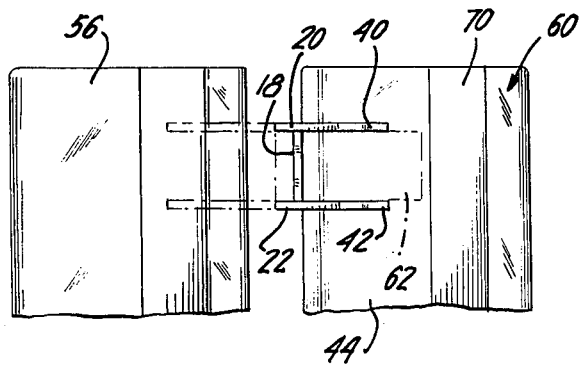
FIG. 7 is a plan view of the frame shown in FIG. 6.

If desired, the frame 10 may also be fashioned with brace support members 50, 52 which telescope in a conventional manner from cross member 18 or longitudinal members 20, 2 and when in the deployed position may be used to brace the frame 10 against the rear portion 54 of a front seat 56 as best shown in FIGS. 6 and 7.

Figure 7A:
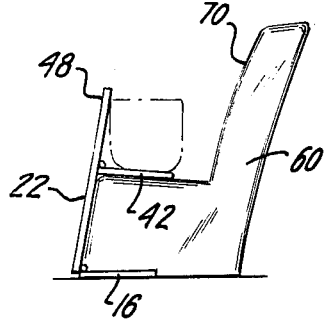
FIG. 7A is a side view of a rear automobile seat and the frame of FIG. 6 wherein a car bed is deployed and confined in a side to side disposition.

It will be seen from FIGS. 1 and 4 to 7 that when the frame is deployed for use in conjunction with back seat 60, a car bed or car seat 62 may be disposed and braced front to rear between the upper portions 46, 48 of longitudinal members 20, 22, respectively, and between the arms 40, 42, respectively. If desired, the longitudinal members 20, 22 may be deployed on track-like members or grooves (not shown for drawing clarity) disposed in cross member 18 so that the members 20, 22 may be moved toward or away from each other so as to be adjustable in position vis-a-vis the carrier 62 disposed therebetween and tightly (or loosely, as desired) confine the carrier 62 therebetween. Where the car bed or car seat is to be deployed from side to side (as shown in FIG. 7A), the upper portion 46, 48 of longitudinal members 20, 22 in conjunction with the back rest 70 of rear seat 60 will function to confine the carrier (car bed) and prevent it from moving toward the front seat 56. In preferred embodiments, the top and undersurfaces 72, 74, respectively, of arms 40, 42, and the surfaces 76 of longitudinal members 20, 22 facing the rear seat 60, and the inside surfaces 78 thereof, will be padded so as to provide a cushioning effect to the carrier confined therewith.

If desired, the carrier may be secured by conventional means such as belts or straps to arms 40, 42 and/or portions 46, 48 to provide further bracing and support for the carrier. It will also be appreciated that all members pivotally attached to other members will be capable of being locked into place at any desired position whether it be a working position or storage position.

Accordingly, it will be seen that the frame 10 provides a sturdy secure platform for any type child carrier which should be sufficient to comply with the most stringent government safety regulations for such safety apparatus.

The frame 10 may be deployed in a manner so as to provide a rocking motion to a car bed or seat confined thereby. Thus, for example, where a car bed is to be secured in a side to side attitude, the sides of the car bed will not be flush with the back rest of the automobile seat and a space will be provided between the car bed and the upper portions 46, 48 of members 20, 22. As the automobile moves, it will impart a gentle rocking motion to the car bed which will rock between the back rest and upper portions 46, 48.

Figure 8:
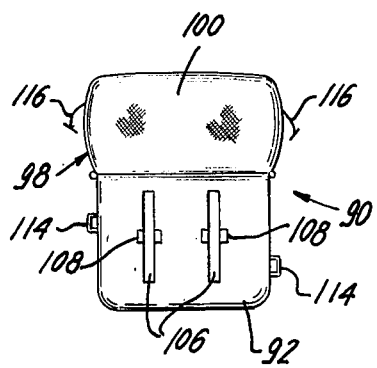
FIG. 8 is a plan view of an alternate embodiment of a support frame in accordance with the present invention.
Figure 8A:
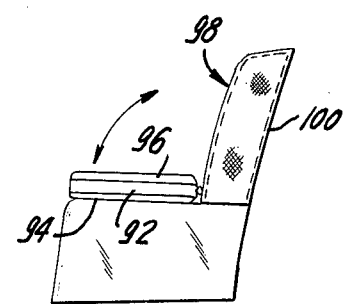
FIG. 8A is a side view of the support frame shown in FIG. 8.
Figure 9:
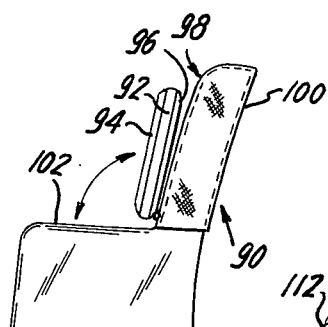
FIG. 9 is a side view of the alternate frame in accordance with the invention shown in FIGS. 8 and 8A deployed in its storage position on a front automobile seat.
Figure 10:
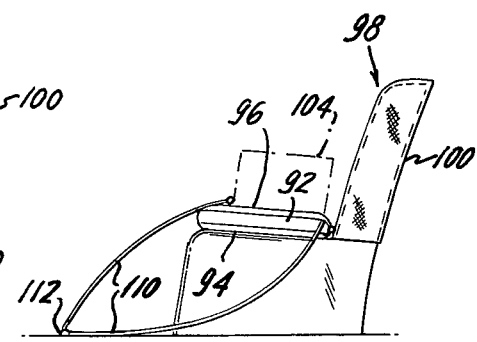
FIG. 10 is a side view of the frame of FIG. 8 deployed in its working position in conjunction with a carrier.

Turning now to FIGS. 8 to 10 there is shown another embodiment of a support frame in accordance with the present invention and identified generally by the numeral 90. As seen in FIGS. 8 and 8A, the support frame 90 includes base portion 92 having an upper surface and lower surface each of which preferably includes cushioning or padding 94 and 96, respectively, the purposes of which will become apparent hereinafter. The base portion 92 is pivotally secured to anchoring means 98 which may take one of several different embodiments. The anchoring means 98 may thus comprise a fabric covered frame 100 (which may be padded as well) designed to fit over the front seat of an automobile as best shown in FIGS. 9 and 10. Alternatively, the anchoring means 98 may comprise belts or straps designed to be secured over and under an automobile seat and looped through eye members (hook-eye arrangements) disposed to the side or rear of the automobile seat and safely out of the way.

In use, the base portion is pivoted downwardly onto the bench portion 102 of the automobile seat. The carrier 104 may be disposed on the base portion 92 as shown in FIG. 10 and may be secured thereto by one of several techniques. For example, the base portion 92 may include grooves or tracks 106 as shown in FIG. 8; in such case, the carrier 104 will be fashioned with tracks or recessed portions, respectively, at the bottom surface thereof (not shown for drawing clarity) designed to be inserted and secured in the grooves or tracks 106, respectively, of base portion 92. Alternatively, the carrier bottom may include hooks designed to catch depressible eye portions 108 attached to the base portion 92. In yet another embodiment as shown in FIG. 10, the carrier 104 may be secured to straps 110 connected to anchor means 112 secured to the floor of the automobile. It will thus be seen that the frame 90 is designed to safely support and confine a carrier and in doing so conform to the strictest safety regulations.

Figure 9A:
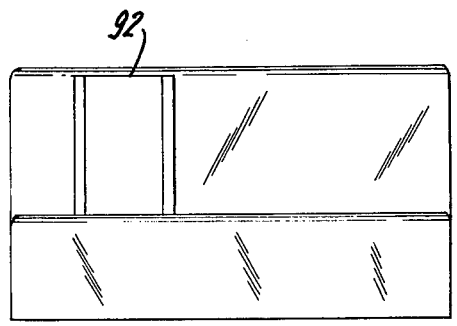
FIG. 9A is a front view of the frame shown in FIG. 9.

When it is desired to remove the carrier 104 from the seat, the carrier 104 is disconnected from the base portion 92; the base portion 92 may then be simply pivoted upwardly against the base rest of the seat as shown best in FIGS. 9 and 9A. The base portion may contain means for fastening the same to the anchoring means 98, such as loops 114 designed to receive fastening members 116 connected to the anchoring means 98 as best shown in FIG. 8. Inasmuch as the underside of base portion 92 is padded, when the base portion is in the up position shown in FIG. 9, a passenger may sit against same comfortably as though the frame 90 were not present at all.

Figure 11:
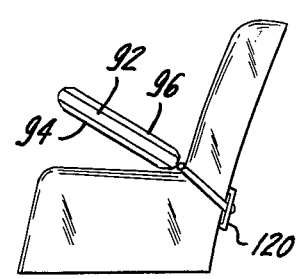
FIG. 11 is a side view of another embodiment of the frame shown in FIG. 8.
Figure 12:
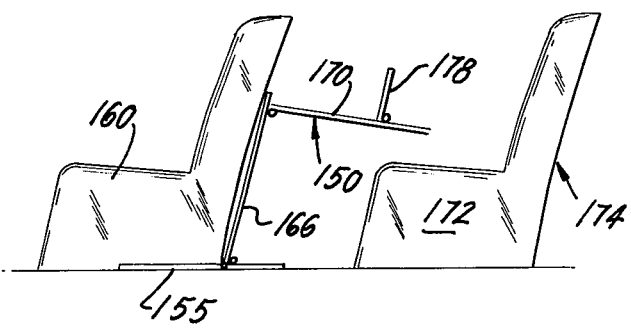
FIG. 12 is a side view of yet another embodiment of a frame similar to that shown in FIG. 1 adapted to be used on the back seat of an automobile.

Turning now to FIGS. 11 and 12 there is shown a support frame similar to that shown in FIGS. 8 to 10. In FIG. 11, the anchoring means 98 described with respect to frame 90 of FIGS. 8, 8A comprise one or more straps or belts pivotally connected to base portion 92 (as shown in FIGS. 8, 8A); the straps are slipped through the space between the back seat 126 and bench portion 128 and are looped through support loops 120 anchored to the floor of the automobile behind the front seat 122 as shown in FIG. 11 or even behind the rear seats of the automobile in the case where the frame 90 is to be employed on the rear seat. As in the case of the support frame shown in FIGS. 8 to 10, the base portion 92 shown in FIG. 11 may be pivoted down against the bench portion 128 and locked into that position (employing any conventional type locking means) and used as a support for a carrier in the manner described hereinbefore. The base portion 92, when not in use, may be pivoted upwardly against the back rest 122 of the automobile and, if desired, locked into such position and so serve as a back rest for a passenger.

Figure 12B:
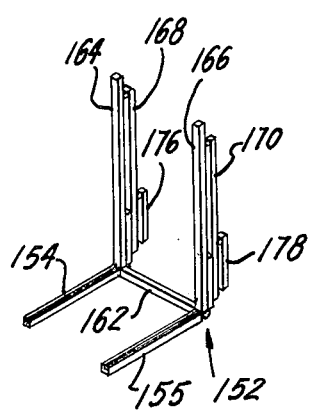
FIG. 12B is view of the frame shown in FIGS. 12, 12A in its collapsed storage disposition.
Figure 12A:
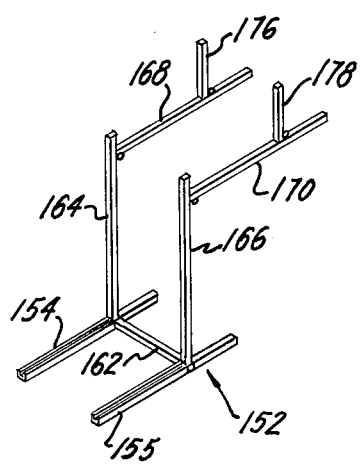
FIG. 12A is a schematic perspective view of the frame shown in FIG. 12.

FIGS. 12, 12A and 12B illustrate another type frame 150, similar to that shown in the afore-described FIGS. 1 to 3. As seen in FIG. 12A, the frame 150 includes base portion 152 which includes one or more lower support arms 154, 155 each connected to cross member 162 and adapted to fit under the front seat as shown in FIG. 12 and secured thereby. A pair of longitudinal members 164, 166 is pivotally connected to support arms 154 and carries upper support arms 168, 170, respectively, pivotally attached thereto. The upper support arms 168, 170 extend over the bench portion 172 of rear automobile seat 174 as shown in FIG. 12. Optional vertical support members 176, 178 are pivotally connected to upper support arms 168, 170, respectively, as shown in FIGS. 12 and 12A. It will be appreciated that the upper support arms 168, 170 and vertical support members 176, 178 function in a manner similar to corresponding members described with respect to FIGS. 1 to 3.

If desired the lower support arms 154, 155 may function as rails or tracks; the longitudinal members 164, 166 may thus be adapted to slide along such rails to be moved toward or away from the bench portion 172 to any desired position depending on the size of the carrier to be secured and confined in a side to side position and locked in at such position (employing conventional locking means). Furthermore, if desired, the cross member 162 may serve as a rail or track so that the longitudinal members 164, 166 may be moved toward each other (along cross member 162) to vary the space between longitudinal members 164, 166, and locked in at such position, depending on the size of the carrier to be confined (front to back) therebetween. In this manner, the frame 150 may be employed in conjunction with any type or size carrier and allows for ease of positioning and removal of the carrier; the carrier may also be confined and secured by means of frame 150 in any desired position, such as horizontally including front to rear and sideways, as well as even vertically.

As shown in FIG. 12B, the frame 150 may be collapsed and stored out of the way against the rear portion of front seat 160 by collapsing the vertical support members against the upper support arms 168, 170 and then collapsing the upper support arms 168, 170 against the longitudinal members 164, 166, respectively. If desired, the portion of the lower support members 154, 155 extending away from the front seat 160 towards the rear seat 174 may be folded upwardly against longitudinal members 164, 166, respectively, and out of the way. Upon removal of the frame 150 from the automobile, the portion of lower support arms 154, 155 adapted to fit under the front seat 160 may also be pivoted upwardly against longitudinal members 164, 166 and thus stored out of the way.

Turning now to FIGS. 13, 14 and 15, there is shown yet another embodiment of a frame in accordance with the present invention and identified generally by the numeral 200. The frame 200 is similar to that shown in FIGS. 8 to 10 and includes a base portion 202 adpated to be positioned on bench portion 204 of automobile seat 206. The base portion 202 includes a unique track-pivot arrangement 208 best shown in FIG. 15 which includes track 210 pivotally connected via pivot 212 to base 202. Anchor means 214 in the form of belts or straps are secured to base 202 as shown and are adapted to slip between bench 204 and back rest 216 as shown in FIGS. 13 and 14 and be connected to anchor means 220 disposed behind the automobile seat 206. As shown in FIGS. 13 and 14, a carrier 218 having a bottom rail or groove may be removably secured to the track or rail 210 of base 202. As seen in FIG. 13 the carrier 218 may be secured in a normal car seat front to back position and maneuverable between horizontal or vertical positions or pivoted 90° on pivot 212 and thus be disposed as a car bed or rocking cradle in a side to side position as seen in FIG. 14. The carrier 218 may also rock about pivot 212. If no rocking motion is desired, the carrier may be secured at a second point (for example, by a conventional hook-eye locking arrangement, not shown for drawing clarity) to the base 202.

It will also be appreciated that the track carrying base 202 and anchor means 214 may be secured to a separate frame (similar to the car seat 206 but smaller of course) and used as such outside of an automobile to provide a lightweight infant seat, bed, rocker, cradle and the like.

What is claimed is:

1. A universal-type locking frame for supporting or limiting movement of a car bed or car seat, said frame being adapted to be employed in an automobile, comprising, in combination, a support base, at least a portion of which is adapted to extend under an automobile seat, at least a pair of longitudinal spaced apart members, the space between said members being sufficiently large to allow a car bed or car seat to be disposed between said members, each of said members being pivotally connected at their lower portions to said support base so that said longitudinal members extend up from said support base and are adapted to be deployed in close proximity to and extending above the bench portion of an automobile seat in their use position and pivoted downwardly to a folded position substantially transverse to the fore and aft direction of the automobile, and a pair of normally horizontally disposed arm members, an arm member being pivotally connected to each of the longitudinal members, said arm members in their working position being disposed above said support base and extending out from the longitudinal members over the bench portion of an automobile seat for supporting or restricting movement of a car bed or car seat deployed on said automobile seat, whereby a car bed or car seat may be positioned on the automobile seat in a manner such that the car bed or car seat extends between and through the space between the longitudinal members so that the longitudinal members and horizontally disposed arm members in conjunction with the backrest portion of the automobile seat may limit movement of the car bed or car seat from side to side and/or front to back and means for holding said longitudinal members in their use position.

2. The locking frame as defined in claim 1 wherein said arm members are adapted to fold up against said longitudinal members for storage purposes.

3. The locking frame as defined in claim 2 wherein said arm members include cushioning means.

4. The locking frame as defined in claim 1 wherein said support base comprises a cross brace connected to and extending between said longitudinal members, and a pair of leg members extending out from and pivotally connected to said cross brace or lower portions of said longitudinal members, said leg members being adapted to be disposed under an automobile seat to thereby secure the remainder of said frame when deployed in an automobile.

5. The locking frame as defined in claim 1 further including one or more brace support members extending from said support base and adapted to be positioned against a lower portion of a second automobile seat when a portion of said support member is disposed under a first automobile seat so as to limit and restrict front to rear movement of said support base deployed in an automobile.

6. The locking frame as defined in claim 5 wherein said brace support members are of telescoping or otherwise extendable design.

7. The locking frame as defined in claim 4 wherein one or more of said longitudinal members and leg members are of telescoping or otherwise extendable design.

8. The locking frame as defined in claim 1 wherein said arm members are of telescoping or otherwise extendable design.

9. The locking frame as defined in claim 4 wherein said longitudinal members and said support base components are padded.

10. The locking frame as defined in claim 4 further including locking means for locking the position of said longitudinal members and arm members in place.

11. The locking frame as defined in claim 1 wherein said horizontally disposed arm members are pivotally connected to each of the longitudinal members in a manner such that the horizontally disposed arm members may be pivoted to a folded position substantially axially parallel to said longitudinal members, and lower portions of said longitudinal members are pivotally connected to said support base in a manner such that the longitudinal members may be pivoted to a folded position which is substantially parallel to the support base, so that in said folded position, said locking frame lies substantially flat on the floor of an automobile and runs substantially parallel to the automobile rear bench seat.

12. The locking frame as defined in claim 4 wherein said horizontally disposed arm members are pivotally connected to each of the longitudinal members in a manner such that the horizontally disposed arm members may be pivoted to a folded position substantially axially parallel to said longitudinal members, and lower portions of said longitudinal members are pivotally connected to said support base in a manner such that the longitudinal members may be pivoted to a folded position which is substantially axially parallel to the cross brace of said support base, so that in said folded position, said locking frame lies substantially flat on the floor of an automobile and runs substantially axially parallel to the automobile rear bench seat.

13. The locking frame as defined in claim 12 wherein said leg members of said support base may be folded by pivoting said leg members to a folded position substantially axially parallel to said longitudinal members.

* * * * *